United States Patent
Kim et al.

(10) Patent No.: US 9,537,156 B2
(45) Date of Patent: Jan. 3, 2017

(54) METHOD FOR MAKING MEMBRANE-ELECTRODE ASSEMBLY FOR FUEL CELL AND METHOD FOR MAKING FUEL CELL SYSTEM COMPRISING THE SAME

(75) Inventors: Hee-Tak Kim, Suwon-si (KR); Hae-Kwon Yoon, Suwon-si (KR); Young-Mi Park, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1329 days.

(21) Appl. No.: 12/755,062

(22) Filed: Apr. 6, 2010

(65) Prior Publication Data

US 2010/0196594 A1 Aug. 5, 2010

Related U.S. Application Data

(62) Division of application No. 11/272,805, filed on Nov. 15, 2005, now abandoned.

(30) Foreign Application Priority Data

Nov. 16, 2004 (KR) .................. 10-2004-0093428

(51) Int. Cl.
- *H01M 4/88* (2006.01)
- *H01M 4/86* (2006.01)
- *H01M 4/92* (2006.01)
- *H01M 8/0234* (2016.01)
- *H01M 8/1004* (2016.01)

(Continued)

(52) U.S. Cl.
CPC ......... *H01M 4/8828* (2013.01); *H01M 4/8605* (2013.01); *H01M 4/8878* (2013.01); *H01M 4/8882* (2013.01); *H01M 4/926* (2013.01); *H01M 8/0234* (2013.01);

(Continued)

(58) Field of Classification Search
CPC H01M 4/8605; H01M 4/8828; H01M 4/8878; H01M 4/882; H01M 4/926; H01M 8/0234; H01M 8/1004
See application file for complete search history.

(56) References Cited

U.S. PATENT DOCUMENTS 3,799,810 A * 3/1974 Wallace ................. 429/112
2001/0049048 A1* 12/2001 Kawahara ............. 429/44

(Continued)

FOREIGN PATENT DOCUMENTS

| CN | 1474469 | 2/2004 |
| CN | 1492531 | 4/2004 |

(Continued)

OTHER PUBLICATIONS

The Fuel Cell Handbook, Oct. 2000, EG&G Services, Fifth Edition, 3-3 to 3-5.

*Primary Examiner* — Eugenia Wang
(74) *Attorney, Agent, or Firm* — Robert B. Bushnell, Esq.

(57) ABSTRACT

A membrane-electrode assembly for a fuel cell of the present invention includes an anode and a cathode facing each other, and a polymer electrolyte membrane interposed therebetween. At least one of the anode and the cathode includes a catalyst layer and an electrode substrate. The catalyst layer includes a catalyst and a porous ionomer. The polymer electrolyte membrane contacts one side of the catalyst layer and the electrode substrate contacts the other side of the catalyst layer.

2 Claims, 2 Drawing Sheets

(51) Int. Cl.
 *H01M 8/02* (2016.01)
 *H01M 8/10* (2016.01)

(52) U.S. Cl.
 CPC .......... *H01M 8/1004* (2013.01); *H01M 4/921* (2013.01); *Y02E 60/522* (2013.01); *Y02E 60/523* (2013.01)

(56) References Cited

U.S. PATENT DOCUMENTS

| | | | |
|---|---|---|---|
| 2002/0004159 A1 | 1/2002 | Totsuka | |
| 2002/0051878 A1* | 5/2002 | Lussier et al. | 428/325 |
| 2002/0058180 A1* | 5/2002 | Beattie et al. | 429/44 |
| 2003/0157397 A1 | 8/2003 | Barton et al. | |
| 2003/0165731 A1 | 9/2003 | Vyas et al. | |
| 2003/0175579 A1* | 9/2003 | Uchida et al. | 429/42 |
| 2003/0207167 A1* | 11/2003 | Prakash et al. | 429/42 |
| 2004/0121219 A1* | 6/2004 | Mei et al. | 429/40 |

FOREIGN PATENT DOCUMENTS

| | | |
|---|---|---|
| JP | 10-241701 | 9/1998 |
| JP | 2004-296435 | 10/2004 |

* cited by examiner

METHOD FOR MAKING MEMBRANE-ELECTRODE ASSEMBLY FOR FUEL CELL AND METHOD FOR MAKING FUEL CELL SYSTEM COMPRISING THE SAME

CROSS-REFERENCE TO RELATED APPLICATIONS AND CLAIM OF PRIORITY

This application is a divisional of applicant's Ser. No. 11/272,805 entitled MEMBRANE-ELECTRODE ASSEMBLY FOR FUEL CELL AND FUEL CELL SYSTEM COMPRISING SAME filed in the U.S. Patent & Trademark Office on 15 Nov. 2005 now abandoned and assigned to the assignee of the above-captioned application. Furthermore, this application makes reference to, incorporates the same herein, and claims all benefits accruing under 35 U.S.C. §119, §120 and §121 from the aforesaid applicant's Ser. No. 11/272,805 now abandoned and from an application for MEMBRANE-ELECTRODE ASSEMBLY FOR FUEL CELL AND FUEL CELL SYSTEM COMPRISING SAME earlier filed in the Korean Intellectual Property Office on 16 Nov. 2004 and there duly assigned Ser. No. 10-2004-0093428.

FIELD OF THE INVENTION

The present invention relates to a membrane-electrode assembly for a fuel cell and a fuel cell system comprising the same. More particularly, the present invention relates to a membrane-electrode assembly with high power and to a fuel cell system comprising the same.

BACKGROUND OF THE INVENTION

A fuel cell is a power generation system for producing electrical energy through an electrochemical redox reaction of an oxidant and a fuel such as hydrogen or a hydrocarbon-based material such as methanol, ethanol, or natural gas.

A fuel cell can be classified into a phosphoric acid type, a molten carbonate type, a solid oxide type, a polymer electrolyte type, or an alkaline type depending upon the kind of electrolyte used. Although each of these different types of fuel cells operates in accordance with the same basic principles, they may differ from one another in the kind of fuel, the operating temperature, the catalyst, and the electrolyte used.

Recently, a polymer electrolyte membrane fuel cell (PEMFC) has been developed. The PEMFC has power characteristics that are superior to conventional fuel cells, as well as a lower operating temperature and faster start and response characteristics. Because of this, the PEMFC can be applied to a wide array of fields such as for transportable electrical sources for automobiles, distributed power sources such as for houses and public buildings, and small electrical sources for electronic devices.

A PEMFC is essentially composed of a stack, a reformer, a fuel tank, and a fuel pump. The stack forms a body of the PEMFC, and the fuel pump provides fuel stored in the fuel tank to the reformer. The reformer reforms the fuel to generate hydrogen gas and supplies the hydrogen gas to the stack. Fuel stored in the fuel tank is pumped to the reformer using power which can be provided by the PEMFC. Then, the reformer reforms the fuel to generate the hydrogen gas, and the hydrogen gas is electrochemically oxidized and the oxidant is electrochemically reduced in the stack to generate the electrical energy.

Alternatively, a fuel cell may include a direct oxidation fuel cell (DOFC) in which a liquid fuel is directly introduced to the stack. Unlike a PEMFC, a DOFC does not require a reformer.

In the above-mentioned fuel cell system, the stack for generating the electricity has a structure in which several unit cells, each having a membrane electrode assembly (MEA) and a separator (also referred to as a "bipolar plate"), are stacked adjacent to one another. The MEA is composed of an anode (also referred to as a "fuel electrode" or "oxidation electrode") and a cathode (also referred to as an "air electrode" or "reduction electrode") that are separated by a polymer electrolyte membrane.

The polymer electrolyte membrane can be fabricated using a perfluorosulfonic acid ionomer membrane such as Nafion® (by DuPont), Flemion® (by Asahi Glass), Asiplex® (by Asahi Chemical), and Dow XUS® (by Dow Chemical). The electrodes including the catalysts supported on the carbon can be fabricated by binding electrode substrates such as porous carbon paper or carbon cloth with a carbon powder carrying pulverized catalyst particles such as platinum (Pt) or ruthenium (Ru) using a water-repellent binder.

What is needed is a high power membrane electrode assembly and a fuel cell system where the transferring rate of the reactant is fast and a high concentration of reactants can be present on the surface of a catalyst.

SUMMARY OF THE INVENTION

An exemplary embodiment of the present invention provides a membrane-electrode assembly for a fuel cell, wherein a catalyst layer has pores and can maintain a concentration of hydrogen and an oxidant on a surface of a catalyst and realize a high-power fuel cell.

Another embodiment of the present invention provides a fuel cell system including the membrane-electrode assembly.

According to one embodiment, a membrane-electrode assembly for a fuel cell includes an anode and a cathode facing each other, and a polymer electrolyte membrane interposed therebetween. At least one of the anode and the cathode includes a catalyst layer and an electrode substrate (a reactant diffusion layer). The catalyst layer includes a catalyst and a porous ionomer. The polymer electrolyte membrane contacts one side of the catalyst layer and the electrode substrate contacts the other side of the catalyst layer.

According to another embodiment, a fuel cell system includes at least one electricity generating element for generating electricity through oxidation of fuel and reduction of an oxidant, a fuel supplier for providing fuel to the electricity generating element, and an oxidant supplier for supplying the oxidant to the electricity generating element. The electricity generating element includes the above membrane-electrode assembly and separators positioned at both sides of the membrane-electrode assembly.

The porous ionomer layer has a porosity ranging from about 40 volume % to about 80 volume %.

The porous ionomer layer has a pore size ranging from about 10 nm to about 1,000 nm.

The porous ionomer layer is present on a surface of the catalyst.

BRIEF DESCRIPTION OF THE DRAWINGS

A more complete appreciation of the present invention, and many of the above and other features and advantages of the present invention, will be readily apparent as the same becomes better understood by reference to the following detailed description when considered in conjunction with the accompanying drawing in which like reference symbols indicate the same or similar components, wherein.

DETAILED DESCRIPTION OF THE INVENTION

An embodiment of the present invention will hereinafter be described in detail with reference to the accompanying drawings.

A membrane-electrode assembly for a fuel cell includes a cathode and an anode facing each other, and a polymer electrolyte membrane interposed therebetween. The cathode and the anode include each a catalyst layer which includes a catalyst (preferably, a metal catalyst).

Fuel is supplied to the anode and an oxidant is supplied to the cathode. The fuel is oxidized at the anode to generate protons and electrons, and then the protons are transferred to the cathode through a polymer electrolyte membrane and the electrons are transferred to the cathode through an out-circuit. The transferred protons and electrons are reacted with the oxidant to generate water and electrical energy.

In order to realize good performance characteristics of a fuel cell, the surface area of the catalyst to participate in the electrochemical reaction should be large, and the concentration of reactants on the surface of the catalyst should be maintained to be high. For this purpose, it is preferable that an ionomer is present to increase transfer of protons.

A large amount of ionomers in the catalyst layer surround the metal catalyst act as a resistance against mass transfer to the metal catalyst. According to one embodiment, the ionomer layer that acts as an ion conductor in the catalyst layer has small pores and thereby reactants such as fuel and the oxidant can easily pass through the porous ionomer layer. The fuel and oxidant can be present at a high concentration on a surface of the metal catalyst to realize a high power membrane-electrode assembly.

The porous ion conductive ionomer allows the reactants to pass through the pores and be quickly transferred to the surface of the metal catalyst. The path between an electrode substrate and the surface of the catalyst is shorter compared to a catalyst layer without pores, and thus the reactant can be quickly transferred, and a limit for fuel cell performance due to a mass transfer limit can be overcome.

Figure 1:
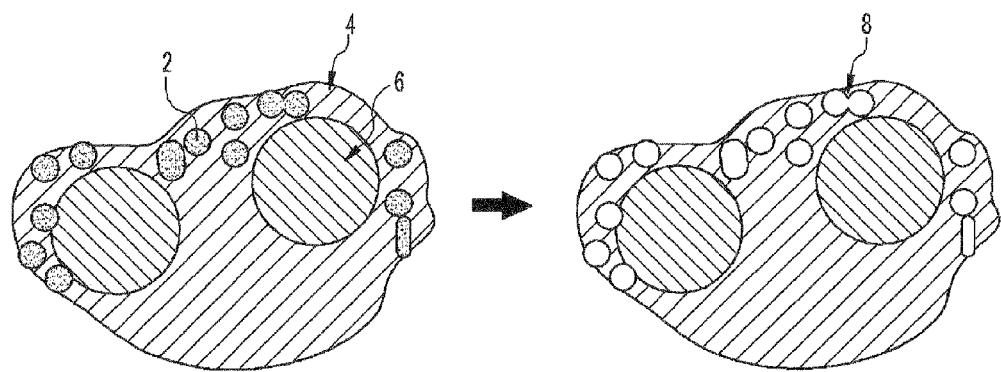
FIG. 1 is a schematic diagram showing processes of forming a porous ionomer layer included in the catalyst layer of the present invention.

FIG. 1 shows a preparation process of the porous ion conductive ionomer. Referring to FIG. 1, a plasticizer 2 is added to a mixture including a metal catalyst 6 and an ion conductive ionomer 4 to prepare a composition for forming a catalyst layer, and the composition is coated on an electrode substrate to form a catalyst layer having an ionomer/plasticizer mixed layer thereon and to fabricate an electrode. Then, the electrode including the catalyst layer is dipped in a solvent that can dissolve the plasticizer to extract the plasticizer 2 and to form the pores 8 in the ionomer layer.

The ionomer layer may have porosity ranging from about 40 volume % to about 80 volume %. When the porosity is less than 40 volume %, reactant fluids are not diffused smoothly. When it is more than 80 volume %, resistance against ion transfer increases.

The pores may have a pore size of about 10 nm to about 1000 nm. When the pose size is less than 10 nm, reactant fluids are not diffused smoothly. When it is more than 1000 nm, the large pores may prevent formation of an ionic transfer pathway.

The electrode for a fuel cell according to the present invention includes an electrode substrate and a catalyst layer, and the catalyst layer includes a porous ionomer polymer layer having pores.

The electrode for a fuel cell is prepared by coating a composition for forming a catalyst layer onto one side of an electrode substrate and drying it to form a catalyst layer. Subsequently, the electrode substrate with the catalyst layer is dipped in a solvent that can dissolve the plasticizer to extract it and to form pores in the ionomer polymer layer.

The catalyst composition includes an ionomer polymer for a binder, a metal catalyst, a plasticizer, and a dispersion solvent.

The ionomer polymer is an ion conductive polymer and transfers protons. The ionomer polymer has an equivalent weight (EW) ranging from about 500 to about 2,000.

The micropores are three-dimensionally connected within the ionomer to impart an ion transfer path. The ionomer may be any proton conductive polymer having a cation exchange group selected from the group consisting of a sulfonic acid group, a carboxylic acid group, a phosphoric acid group, a phosphonic acid group, and derivatives thereof, at its side chain.

Non-limiting examples of the proton conductive polymer include perfluoro-based polymers, benzimidazole-based polymers, polyether-based polymer, polyimide-based polymers, polyetherimide-based polymers, polyamide-based polymers, polyphenylene sulfide-based polymers, polysulfone-based polymers, polyethersulfone-based polymers, polyetherketone-based polymers, polyether-etherketone-based polymers, and polyphenylquinoxaline-based polymers. In a preferred embodiment, at least one ionomer may include but is not limited to a polymer selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, aryl ketones, poly(2, 2'-(m-phenylene)-5,5'-bibenzimidazole), and poly(2,5-benzimidazole).

For the plasticizer, a compound having hydrophilicity and/or hydrophobicity and a number average molecular weight ranging from 200 to 50,000 may be used. When the molecular weight of the plasticizer is less than 200, the plasticizer may volatilize during fabrication of an electrode and a small amount of the plasticizer may remain. Therefore, it is difficult to make pores by extracting the plasticizer. On the contrary, when the molecular weight is more than 50,000, entanglement of the plasticizer occurs excessively and thereby the plasticizer is not easily extracted.

The plasticizer includes at least one polymer selected from the group consisting of a C1 to C10 polyalkylene glycol such as polyethylene glycol and polypropylene glycol; a C1 to C10 polyalkylene oxide such as polyethylene oxide and polypropylene oxide; a C1 to C10 poly(alkyl) acrylic acid such as polyacrylic acid and polymethacrylic acid; an aromatic or fluoro-based polymer such as polystyrene having a sulfonic acid group and polyfluoro sulfonic acid; and a cellulose-based polymer.

The weight ratio of the plasticizer to the ionomer may be from 20:80 to 70:30, and preferably from 40:60 to 60:40.

When the amount of the plasticizer is less than 20 weight %, sufficient pores may not be made, and when it is more than 70 weight %, the pores may prevent formation of an ionic transfer pathway resulting in increase resistance against ion transfer.

The dispersion solvent includes at least one selected from the group consisting of isopropanol, dimethylsulfoxide, dimethylacetamide, N-methylpyrrolidone, and a mixture thereof. When the dispersion solvent is an alcohol-based solvent, it may be used with water.

The extraction solvent for the plasticizer includes at least one selected from the group consisting of an alcohol-based solvent such as methanol, ethanol, isopropanol and so on; an ether-based solvent such as dimethyl ether, diethyl ether, and so on; tetrahydrofuran; and a mixture thereof.

The ionomer polymer is dispersed in the composition for forming a catalyst layer. The composition may be coated using screen printing, spray coating, or a doctor blade method depending on the viscosity thereof, but is not limited thereto.

Alternatively, the catalyst including a porous ionomer polymer layer may be formed using a catalyst composition which includes an ionomer polymer for a binder, a metal catalyst, fumed silica, and a dispersion solvent.

In the above catalyst composition, the ionomer polymer, metal catalyst, and dispersion solvent are the same as above-described. The fumed silica may have a specific surface area ranging from 100 to 1200 m$^2$/g, and a particle size of 10 nm to 1000 nm.

The weight ratio of the fumed silica to the ionomer may be from 10:90 to 50:50, and preferably from 30:70 to 40:60. When the amount of the fumed silica is less than 10 weight %, sufficient pores may not be formed, which prevents diffusion of reactant fluids, and when it is more than 50 weight %, the pores may prevent formation of an ionic transfer pathway resulting in increased resistance against ion transfer.

The composition for forming a catalyst layer is coated onto one side of an electrode substrate and fired to form a catalyst layer including the porous ionomer polymer layer. The composition may be coated using screen printing, spray coating, or a doctor blade method depending on the viscosity thereof, but is not limited thereto. The firing may be performed at a temperature ranging from 60 to 130° C.

The catalyst layer of the electrode preferably includes a metal catalyst which enables a related reaction (the oxidation of fuel and the reduction of the oxidant). Suitable choices for the metal catalyst include at least one catalyst selected from the group consisting of platinum, ruthenium, osmium, a platinum-ruthenium alloy, a platinum-osmium alloy, a platinum-palladium alloy, and a platinum-M alloy where a suitable M is at least one transition metal selected from the group consisting of Ga, Ti, V, Cr, Mn, Fe, Co, Ni, Cu, and Zn. Among them, it is preferable to use at least one selected from the group consisting of platinum, ruthenium, osmium, a platinum-ruthenium alloy, a platinum-osmium alloy, a platinum-palladium alloy, a platinum-cobalt alloy, or a platinum-nickel alloy.

The metal catalyst is preferably supported on a carrier. The carrier may include carbon such as acetylene black, graphite, and so on, or an inorganic material particle such as alumina, silica, zirconia, titania, and so on. In one embodiment, the catalyst is a commercially available catalyst, or a produced product in which a noble metal material is supported on the carrier. Since the process to support the noble metal on a carrier is known to this art, even though it is omitted from this description, one skilled in the art may easily understand the present invention.

The electrode substrate supports the catalyst layer and enables a reaction fluid to diffuse into the catalyst layer. The electrode substrate may include carbon paper or carbon cloth, but is not limited thereto. It may be treated with a fluorine-based polymer in order to provide a water repellant property so as to prevent deterioration of reactant diffusion efficiency by water generated during driving of the fuel cell. The fluorine-based polymer includes polyvinylidenefluoride, polytetrafluoroethylene, fluorinated ethylenepropylene, polychlorotrifluoroethylene, a fluoroethylene polymer, and so on.

The electrode may further include porous layers in order to increase the reactant diffusion effects between the electrode substrate and the catalyst layers.

The porous layer may be formed by coating a composition including a conductive powder, a binder, and an ionomer as needed. In general, the conductive powder with small diameter particles can include carbon powder, carbon black, acetylene black, activated carbon, or a nano-carbon such as carbon nanotubes, carbon nanofiber, carbon nanowire, carbon nanohorns, carbon nanorings, and the like. Non-limiting examples of the binder can be polytetrafluoroethylene (PTFE), polyvinylidene fluoride, copolymers of polyvinylidenefluoride-hexafluoropropylene (PVDF-HFP), polyvinylalcohol, cellulose acetate, and so on.

The present invention also provides a membrane-electrode assembly including the above electrode. The membrane-electrode assembly is fabricated by positioning a polymer electrolyte membrane between the anode and cathode and firing. The cathode and anode may be the above-described electrode.

The polymer electrolyte membrane includes a proton conductive polymer. The proton conductive polymer for the electrolyte membrane of the present invention may be any polymer resin having a cation exchange group selected from the group consisting of a sulfonic acid group, a carboxylic acid group, a phosphoric acid group, a phosphonic acid group, and derivatives thereof at its side chain. The proton-conducting polymer may be selected from the group consisting of perfluoro-based polymers, benzimidazole-based polymers, polyether-based polymers, polyimide-based polymers, polyetherimide-based polymers, polyamide-based polymer, polyphenylene sulfide-based polymers, polysulfone-based polymers, polyethersulfone-based polymers, polyetherketone-based polymers, polyether-etherketone-based polymers, and polyphenylquinoxaline-based polymers. In a preferred embodiment, at least one proton-conducting polymer may include but is not limited to a polymer selected from the group consisting of poly(perfluorosulfonic acid), poly(perfluorocarboxylic acid), co-polymers of tetrafluoroethylene and fluorovinylether containing sulfonic acid groups, defluorinated polyetherketone sulfides, aryl ketones, poly(2,2'-(m-phenylene)-5,5'-bibenzimidazole), and poly(2,5-benzimidazole). According to the present invention, a proton-conducting polymer included in a polymer electrolyte membrane for a fuel cell is not limited to these polymers.

A fuel cell system of the present invention includes at least one electricity generating element, a fuel supplier, and an oxidant supplier. The electricity generating element includes at least at least one unit cell where the above membrane-electrode assembly is positioned between separators having reactant flow channels and cooling channels.

The fuel cell system generates electricity through an oxidation of fuel and reduction of an oxidant. The fuel includes hydrogen or a hydrogen-containing hydrocarbon. The oxidant includes air or pure oxygen. The fuel supplier supplies fuel to the electricity generating element, and the oxidant supplier supplies the oxidant to the electricity generating element.

Figure 2:
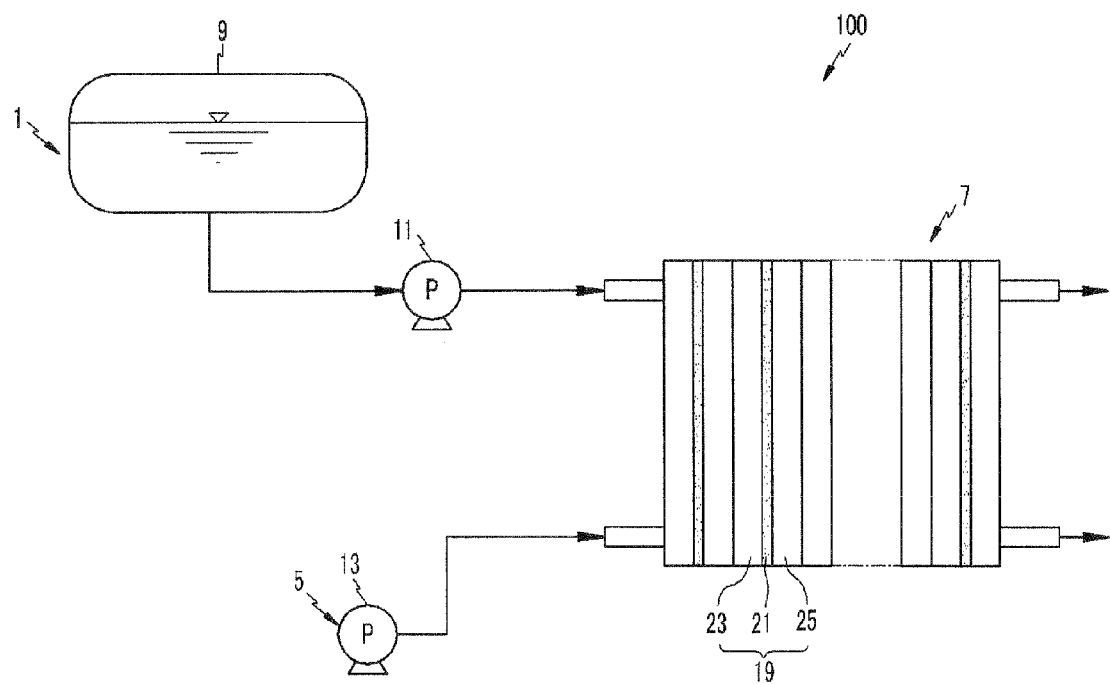
FIG. 2 is a schematic diagram showing a fuel cell system according to the present invention.

The schematic structure of the fuel cell system according to the present invention is illustrated in FIG. 2 and will be described below referring to the drawing.

The fuel cell system 100 includes a stack 7 which includes at least one electricity generating element 19 for generating electrical energy through oxidation of fuel and reduction of an oxidant, a fuel supplier 1, and an oxidant supplier 5.

The fuel supplier 1 is equipped with a fuel storage tank 9, and a fuel pump 11 connected to the fuel tank 9. The fuel pump 11 discharges fuel stored in the fuel tank 9 with a predetermined pumping force.

The oxidant supplier 5 for supplying oxidant to the electricity generating element 19 of the stack 7 is equipped with at least one pump 13 to provide the oxidant with a predetermined pumping force.

The electricity generating element 19 includes a membrane-electrode assembly 21 which performs oxidation of fuel and oxidant reduction, and separators 23 and 25 which are positioned at both sides of the membrane-electrode assembly and provide fuel and oxidant to the membrane-electrode assembly 21.

In the fuel cell system of the present invention, fuel is supplied to the anode and an oxidant is supplied to the cathode to generate electricity through an electrochemical reaction between the anode and cathode. At the anode, hydrogen or an organic raw material is oxidized, and at the cathode, the oxidant is reduced so that a voltage difference between the electrodes occurs.

The following examples illustrate the present invention in further detail. However, it is understood that the present invention is not limited by these examples.

EXAMPLE 1

3 g of Pt/C including 20 weight % of platinum, 1 g of an ionomer (from Dupont Company) and 2 g of dibutylphthalate as a plasticizer were added to 20 g of IPA (isopropyl alcohol) to prepare a catalyst slurry. Then, the catalyst slurry was coated on water-repellent treated carbon paper (the electrode substrate) to a catalyst layer.

The carbon layer including the catalyst layer was dried and was dipped in methanol, which is capable of dissolving the plasticizer, at 40° C. for 2 hours to extract the plasticizer and form an electrode including the porous ionomer layer.

Two electrodes fabricated as above were positioned as an anode and a cathode at both sides of a poly(perfluorosulfonic acid) membrane (Nafion® of the DuPont Company) and the whole was fired at 130° C. for 1 minute and hot-pressed to fabricate a membrane-electrode assembly.

The membrane-electrode assembly was inserted between two gasket sheets and was then positioned between two separators having predetermined shaped reactant flow channels and cooling channels. Thereafter, it was interposed between copper end plates and pressed to fabricate a unit cell.

EXAMPLE 2

A unit cell was fabricated by the same method as in Example 1, except that polyethyleneglycol having a molecular weight of 300 was used as the plasticizer.

COMPARATIVE EXAMPLE 1

A unit cell was fabricated by the same method as in Example 1, except that the plasticizer was not added to the catalyst slurry. In the electrode according to Comparative Example 1, the porous ionomer layer was not formed.

With respect to the fuel cells fabricated in accordance with Examples 1 and 2 and Comparative Example 1, 50% humidified air and hydrogen were respectively supplied to the cathode and anode without back pressure, and they were operated at 60° C. After operating the fuel cell systems according to Examples 1 and 2 and Comparative Example 1, voltage-current density values were measured. The results are shown in FIG. 3.

Figure 3:
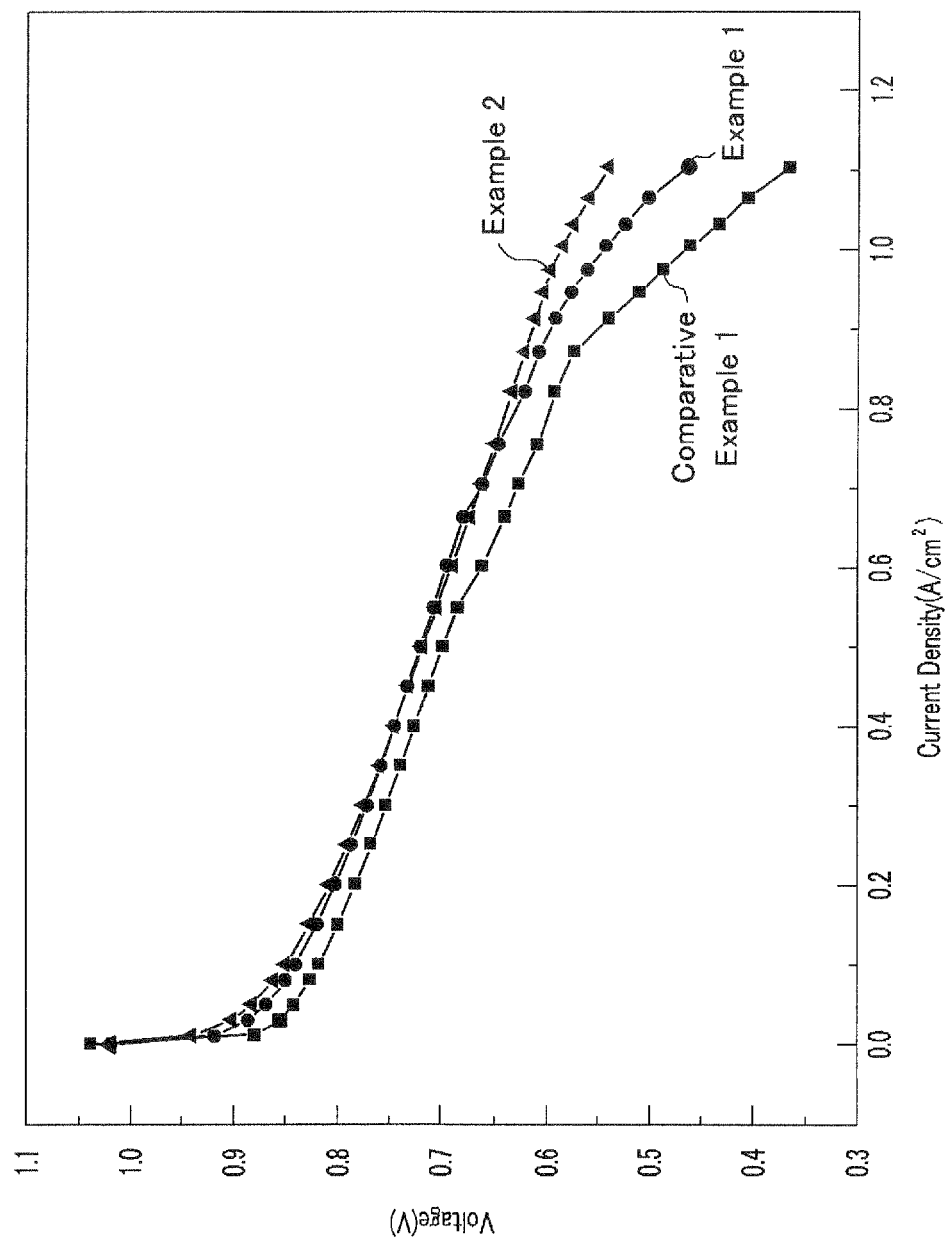
FIG. 3 is a graph showing measurement results of voltage to current of Examples 1 and 2 and Comparative Example 1.

Referring to FIG. 3, the electrodes according to Examples 1 and 2 including the porous ionomer layer show better performance characteristics than those of Comparative Example 1.

The electrode for a fuel cell of the present invention includes a porous ionomer layer in which reactants are transferred to the surface of the catalyst through pores. The porous ionomer layer reduces a path between the electrode substrate and the surface of the catalyst, and thereby the transferring rate of the reactant become fast and a high concentration of reactants can be present on the surface of the electrode to realize a high power membrane-electrode assembly and fuel cell system.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A method for manufacturing a membrane-electrode assembly, comprising:
   preparing an anode and a cathode, at least one of the anode and the cathode comprising:
      a catalyst layer comprising a catalyst and a porous ionomer layer, the catalyst layer formed by a process comprising:
         preparing a catalyst slurry comprising the catalyst, an ionomer, a plasticizer and a dispersion solvent, wherein, the plasticizer is at least one polymer selected from the group consisting of a C1 to C10 polyalkyleneglycol; a C1 to C10 poly(alkyl) acrylic acid; an aromatic or fluorine polymer having a sulfonic acid group; and a cellulose-based polymer, the weight ratio of the plasticizer to the ionomer ranges from about 20:80 to 70:30;
         coating the slurry onto an electrode substrate; and
         extracting the plasticizer wherein the plasticizer is extracted by dipping the coated electrode substrate in an extraction solvent; and
      the coated electrode substrate enabling a reactant to diffuse into the catalyst layer; and
   preparing a polymer electrolyte membrane interposed between the anode and the cathode.

2. The method of claim 1, wherein the extraction solvent is selected from the group consisting of an alcohol-based solvent, an ether-based solvent, tetrahydrofuran, and a mixture thereof.

* * * * *